United States Patent [19]

Rossin

[11] Patent Number: 4,468,657
[45] Date of Patent: Aug. 28, 1984

[54] SIMPLIFIED INTRUDER DETECTOR

[76] Inventor: John A. Rossin, 1411 Norman Firestone Rd., Goleta, Calif. 93117

[21] Appl. No.: 247,234

[22] Filed: Mar. 25, 1981

Related U.S. Application Data

[63] Continuation-in-part of Ser. No. 215,800, Dec. 12, 1980, , Ser. No. 192,067, Sep. 29, 1980, , Ser. No. 73,869, Sep. 10, 1979, , and Ser. No. 117,957, Feb. 4, 1980.

[51] Int. Cl.³ .............................................. G08B 13/18
[52] U.S. Cl. .................................... 340/555; 250/340; 250/353; 340/527; 340/636
[58] Field of Search ............... 340/510, 514, 527, 555, 340/556, 567, 565, 636, 663; 250/340, 343, 353; 338/18

[56] References Cited

U.S. PATENT DOCUMENTS

| | | | |
|---|---|---|---|
| 3,524,180 | 8/1970 | Cruse | 340/567 X |
| 3,551,676 | 12/1970 | Runnels | 250/353 |
| 3,631,434 | 12/1971 | Schwartz | 340/567 |
| 3,751,664 | 8/1973 | Falbel | 250/353 |
| 3,760,399 | 9/1973 | Schwartz | 340/567 |
| 3,829,693 | 8/1974 | Schwarz | 250/342 X |
| 3,839,640 | 10/1974 | Rossin | 250/353 |
| 3,923,382 | 12/1975 | Harding | 250/353 X |
| 3,928,849 | 12/1975 | Schwarz | 340/567 X |
| 3,958,118 | 5/1976 | Schwarz | 340/567 X |
| 4,052,716 | 10/1977 | Mortensen | 340/567 X |
| 4,179,691 | 12/1979 | Keller | 340/567 |

Primary Examiner—Glen R. Swann, III
Attorney, Agent, or Firm—Spensley Horn Jubas & Lubitz

[57] ABSTRACT

A Simplified Intruder Detector is disclosed that incorporates a compact, unique optical system and detector array, including pyroelectric elements mounted in an adjacent, facing relationship. This causes radiation passing through one element to immediately pass through the adjacent element, thereby ensuring that white light, to which the detector elements are not particularly responsive, will generate substantially the same electrical signal in both elements. The electrical system preferably includes a unique power test feature to regularly insure that the system is adequately powered, but only after an intruder has been detected, thereby avoiding nonresponse to an intruder as well as false alarms.

8 Claims, 4 Drawing Figures

SIMPLIFIED INTRUDER DETECTOR

CROSS-REFERENCE TO RELATED APPLICATIONS

This application is a continuation-in-part of applicant's co-pending applications U.S. Pat. Ser. No. 215,800 filed Dec. 12, 1980 and entitled Simplified Intruder Detection Module, U.S. Pat. Ser. No. 192,067 filed Sept. 29, 1980 and U.S. Pat. Ser. No. 73,869 filed Sept. 10, 1979, both entitled Improved Intruder Detection System, and also is a continuation-in-part of applicant's copending application U.S. Pat. Ser. No. 117,957 filed Feb. 4, 1980, entitled Intruder Detection System.

BACKGROUND OF THE INVENTION

1. Field of the Invention

The invention concerns an intruder detector, particularly one adapted to be mounted in the wall of a home or business, the detector incorporating an improved and simplified system for sensing and signalling the presence of an intruder within the areas viewed by the system.

2. Prior Art

Numerous systems have been designed and are presently in use to sense and signal the presence of an intruder within a defined area.

Some intrusion detection systems are active in nature, producing a signal within or confined to a secure area. The signal is affected by the presence of an intruder and this effect is employed to actuate an alarm or other signal. Not only do such active systems require a continuous energy input, but they are prone to false alarms and their presence can be detected by the intruder, all of which cause the system to be ignored, avoided or otherwise negated.

Some intrusion detection systems are of a passive nature. Most passive systems detect the presence of an intruder in a defined area by sensing and responding to visible or non-visible radiation of the intruder. Rossin U.S. Pat. No. 3,839,640, dated Oct. 1, 1974, presents an example of an intruder detection system responsive to infrared radiation, a system that is remarkably free from false alarms.

Intrusion detection systems are subjected to a number of non-intruder related inputs, all of which must be distinguished from an intruder related input if the system is to prove practical in use. Inputs which can cause passive infrared systems to produce false alarms include reflected sunlight from an airplane or automobile, or light being directed onto the detector from automobile headlights or a flashlight out of the detection area. An intermittent electric heater, or a flickering light bulb in the detector's field of view, also can actuate present systems, causing a false alarm.

OBJECTIVES

An object of the present invention is to provide an intruder detector designed and adapted to avoid producing an alarm signal in response to non-intruder related inputs, but to produce an alarm signal only in response to the presence of an intruder within a monitored area. This and other objects will be apparent to those skilled in this field from the following detailed description of a preferred embodiment of the invention.

BRIEF SUMMARY OF THE INVENTION

The preferred Intruder Detector of the invention incorporates sensor means for producing an electrical signal in response to non-visible radiation emitted by an intruder, the sensor means having at least one pair of sensor elements, each sensor element of which preferably is substantially opaque to non-visible radiation but substantially transparent to visible radiation. The Detector includes optical means that direct both visible and non-visible radiation from a plurality of zones onto the sensor means, the radiation from one zone being directed onto one sensor element of the sensor pair, the radiation from a second zone being directed onto the second sensor of the sensor pair. Means are also provided to direct radiation passing through one sensor of the pair to the other sensor of the pair. Electronic means are included in the Detector, the means being responsive to the electrical signal outputs of the sensor pair to produce an alarm signal if one then the other of the sensors produces an output, but to inhibit an alarm signal if both sensors produce an output at substantially the same time. Such a Detector and system has been found to discriminate quite well between visible light flashes and movement of a non-visible radiation source across the zones defined by the optical means to produce an alarm signal only in response to such non-visible radiation source movement.

Preferably the optical means of the Detector includes a reflector. Radiation is directed from the reflector to the sensor means, thereby enabling each sensor of the sensor pair to view a multiplicity of zone. Also, preferably the sensor elements are mounted in a parallel, back-to-back relationship so that short wave infrared and white light radiation passing through one sensor immediately impinges upon the other sensor.

In a preferred construction, the electronic means of the Detector includes means connected to the sensor elements and responsive to the electrical signals they generate to produce an alarm signal, this means having two channel means, each channel means being connected to a corresponding one of the pair of sensor elements to produce a first output signal when the output of the sensor element reaches a given level indicative of the presence of an intruder. Alarm actuation means are connected to be electrically responsive to the first output signals of the two channel means to generate an alarm signal. Means are also included to respond to the substantially simultaneous generation of first output signals to inhibit the generation of an alarm signal, thereby detecting environmentally related or extraneous inputs to the system and preventing false alarms.

Timing means also are included in the electronic means to define an initial period during which substantially simultaneous inputs to the channel means will be cancelled, then a subsequent period (the normal period for an intruder to cross the fields of view), this period resulting in an alarm signal if a second output signal occurs within it. A power (e.g., battery) test circuit also is included this circuit monitoring the power source of the system and inhibiting re-arming of the system, once an alarm signal is generated, until adequate power is applied (e.g., the battery is replaced). Accordingly, each time an event is detected, the electronic means will recheck itself to make sure that it is operating properly.

While the preferred embodiment of the Intruder Detector incorporates a variety of important and unique features, of course variations in the preferred Detector, and changes in the various systems included in that Detector, will be apparent to those skilled in this art from the teachings set forth herein.

BRIEF DESCRIPTION OF THE DRAWINGS

The invention will be further described in connection with the accompanying drawings, in which.

DETAILED DESCRIPTION

As has been stated, because of various features of the Detector and its subsystems, the Intruder Detector described herein is uniquely capable of sensing and detecting the presence of an intruder in a monitored area while avoiding false alarms from other inputs. In part, these features are attained by a unique and versatile optical system and its interrelationship with the detector array; in part these advantages are achieved by certain features of the electronic system; in part it is achieved by the synergistic cooperation of these systems and the detector array.

While these components and advantages will be described subsequently, it is the teachings presented herein to those skilled in this field, not the specific embodiments, that are inventive. Others may use such teachings in different environments to achieve similar or identical results. Also, others may add other features to the Module herein described, or vary certain of the constructions herein set forth to suit their design preferences, or for other reasons. Accordingly, while certain preferred embodiments of the invention are described, and while certain variations or modifications in the design and construction of these embodiments also are described, since other variations likely will occur to those skilled in this field, the invention should not be thought of as limited in any way to such specific embodiments.

Figure 1:
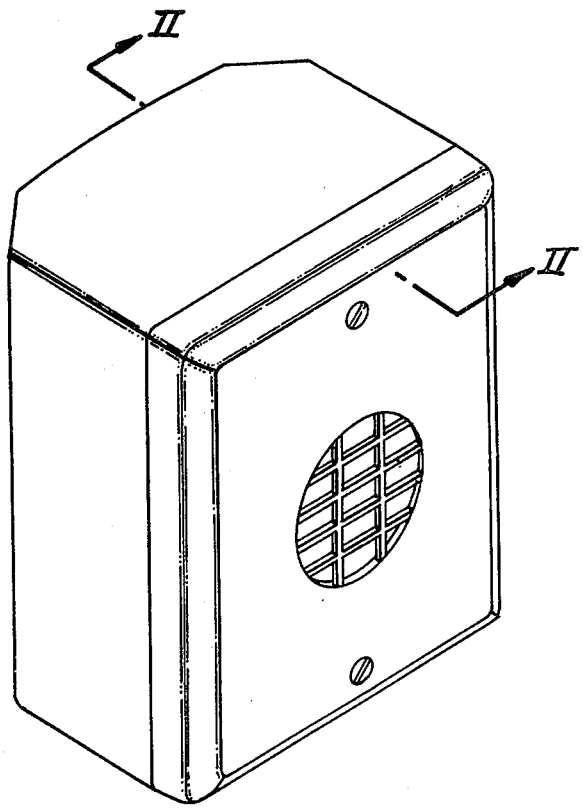
FIG. 1 is a perspective view of the Intruder Detector.
Figure 2:
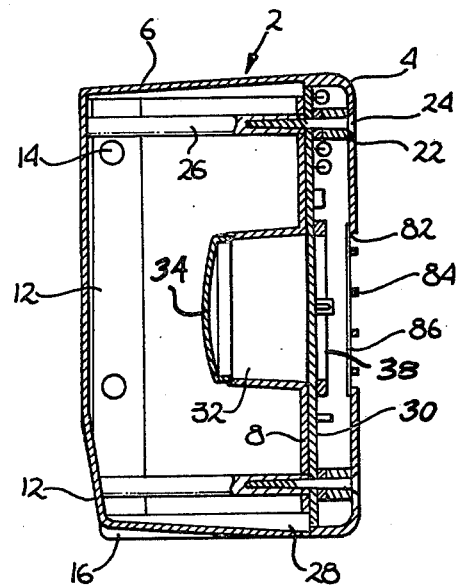
FIG. 2 is a view and vertical cross-section of the Detector taken on lines II—II of FIG. 1.

The Intruder Detector is shown in perspective view in FIG. 1, and in a vertical cross-sectional view in FIG. 2, this view being taken on lines II—II of FIG. 1. As FIG. 1 well illustrates, the external appearance of the Detector is quite similar to the external appearance of a wall outlet box and face plate. Because of the unique optical design, electronic system packaging, and other features of the Detector, in overall dimensions it can closely approximate the dimensions of a wall outlet box and face plate. Thus it can be made to be quite inconspicuous when mounted in a manner and location to simulate an electrical outlet or switch.

As best shown in FIG. 2, preferably the Detector 2 includes a face plate 4 received in a casing 6, there being a back plate 8 positioned between the face plate and the casing. Preferably sufficient space is provided between the casing and the back plate to receive auxiliary equipment such as a radio transmitter or hard-wired alarm circuit connection to the system within the Detector.

In the preferred embodiment, the casing 6 is shaped to provide a number of planes or surfaces 12, these surfaces including various recesses 14, sometimes called flashed holes to enable the Detector to be installed at one of various angles preset by these planes. Also, preferably the casing includes two base ridges 16, the bottom surfaces of which lie at approximately 90 degrees to the front and back faces of the Detector permitting the Detector to be positioned upright on these ridges, the ridges resting on a horizontal surface such as a table or the underside of a desk. Of course, a preferred mounting of the module is within a wall, the face plate projecting slightly beyond the plane of the wall to simulate a normal electrical wall outlet face plate or switch face plate.

Face plate 4 includes two openings 22, each opening receiving a screw 24 that threads into a column 26 projecting towards the face plate from the back surface of the casing. Openings 22 are spaced in the standard separation of openings in a typical wall face plate, thereby permitting screws 24 to attach the face plate 4, back plate 8 and the structure between these two plates to a typical electrical wall outlet box if desired, or simply to be screwed into a wall if no outlet box is conveniently located. Also, preferably face plate 4 includes a recess portion about its rim to receive the outer edges of the back plate, the back surface of the back plate and the rear edge of the face plate thereby lying in the same plane, the two plates forming a compact unit. The back plate may include recesses to receive lugs 28 in the casing, thereby to positively position and orient the face plate and back plate relative to the casing independent of screws 24. Between the face plate and the back plate is received a printed circuit board 30 bearing the Detector's electronic system.

The optical system includes a conical barrel 32 projecting outwardly from the back plate and receiving, in its outer end, a cap 34. The inner surface of this cap is shaped (preferably aspherically to correct the optical system), and is coated, to constitute the spherical, concave reflector of the optical system. The inner end of the barrel forms, or constitutes a ring or opening 38.

Figure 3:
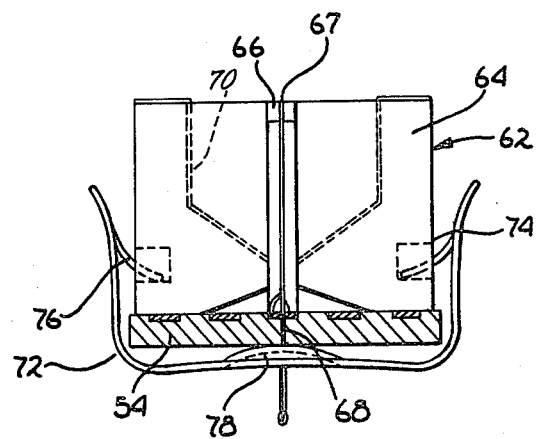
FIG. 3 is an enlarged cross-sectional view of the preferred detector array and the associated printed circuit board tab.

The printed circuit board 30 bearing the electronic system is mounted as shown in FIG. 2. The board includes a large opening that approximates in shape and size the inner opening of ring 38. The board further incorporates a tab portion 54 that extends into the space defined by ring 38. On this tab 54 at the center of ring 38, which is also the geometrical axis of the system, is mounted a detector array 62, one edge of the array preferably being at the center of the system to provide the desired view pattern. This detector array is best illustrated in FIG. 3, where it is shown in an enlarged vertical cross-section.

The detector array 62 consists of two identical secondary reflectors 64 mounted in an opposed relationship, as shown, and two detector element frames 66 which are also mounted in an opposed relationship. Preferably each detector frame is formed of an insulating material, such as from a sheet of unplasticized polyvinyl chloride, and has attached to its outer face by an adhesive such as an ultraviolet cured optical adhesive made by Norland, or any other appropriate means, a piece of pyroelectric material such as polyvinylidine flouride (PVF2). Many other pyroelectric materials are also suitable, such as the many transparent ceramic pyroelectrics, or triglycine sulfate (TGS). The outer surface of this material (the surface facing away from the adjacent frame) is coated with an appropriate material, such as indium tin dioxide, to be both transparent and electrically conductive in one more defined areas, or over its entire surface. The inner surface of this material, and the inner surface of the frame (the surfaces facing towards the adjacent frame) are also coated with a conductive material, such as indium tin dioxide, either over certain defined areas or over its entire surface, to provide one or more electrodes opposed to the electrode provided on the outer face of the material, thereby forming one or more detector elements, or sensors. In addition, a piece 67 of material such as unplasticized polyvinyl chloride, a material that is transparent to visible radiation but is relatively opaque to infrared radiation, may be included between the frames for very high sensitivity long range models to prevent any long wavelength infrared radiation (e.g. 10 microns) passing from one pyroelectric element to the other. Thus, white light and short wavelength infrared radiation will effect both elements substantially equally, but long wavelength infrared radiation coming from one field of view (such as from an intruder) will only effect one of the elements or sensors.

After being so fabricated, these frames and the secondary reflectors may be held together by one or more springs, as subsequently described, or they may be bonded together such as by an appropriate adhesive. In any event, a wire 68 (see FIG. 3) projects from between the frames, this wire being attached to a common return line, to electrically attach the inner electrodes of the detector elements or sensors to the electronic system included in the Detector. The outer conductive coatings on the pyroelectric pieces provided on the outer surfaces of the detector array are similarly connected to conductive strips provided on the printed circuit tab, preferably through an electrically conductive and reflective coating on secondary reflectors 64, and thereby to the Detector's electronic system.

As has been stated, the detector element is received between two secondary reflectors 64. Each of these reflectors includes an inner surface 70 at substantially 45 degrees to the plane defined by the faces of the detector frame. Of course, other configurations may be employed for inner surface 70; they may have a parabolic shape, for example. The inner surfaces, and the channel within the secondary reflector terminating in these surfaces, preferably are coated with a reflective material, such as gold, to direct radiation entering the detector array onto the detector elements positioned on the frames. A spring or other element 72 surrounds the secondary reflectors and frames to clamp and hold them together as a unit. Recesses 74 provided within the secondary reflectors 64 receive the ends 76 of the spring. The spring is shaped to not only hold the array together but also to clip the detector array to the printed circuit tab. The center portion of the spring may be shaped to provide a raised dimple 78 that seats in an opening in the tab to assist in positioning the array on the printed circuit tab.

Face plate 4 of the Detector includes a central opening 82 generally overlying ring 38 of the back plate, this opening including a grill 84. Behind grill 84, and on the inner surface of face plate 4, is mounted a sheet 86 of material that is substantially opaque to visible light but transparent to non-visible radiation, particularly infrared radiation, such as a sheet of white polyethylene.

Both visible and non-visible radiation passing through opening 82 and sheet 86 may thereafter pass through ring 38 and along barrel 32 to be reflected from the primary spherical reflector 34. Certain rays of that radiation will then pass to the detector array, striking the inner reflective surface of secondary reflector 64 and passing through the pyroelectric material mounted on the adjacent detector frame. Since this material is substantially opaque to non-visible radiation, such as the detected infrared radiation, most of the infrared radiation will be absorbed by the material and generate a corresponding electric potential in the material. This potential is sensed as an electrical signal by the electrical system through its contacts to the material, appropriate printed circuit contacts being provided along tab 54. Because of the absorption of infrared energy in the material, only a very small portion of the radiation will pass from the first frame to the second frame. In this fashion, the detector elements on the two frames view one or more discrete areas defined by the optical system and separately respond to non-visible radiation in those fields of view.

Some visible radiation and all short wavelength infrared radiation (e.g. less than 3 microns) will pass through the opaque sheet 86, particularly if a strong source of visible light (such as reflected sunlight) is directed onto the Detector. This visible light will pass along the optical system to be reflected by the primary reflector 34 and by secondary reflectors 64 to strike the adjacent detector element. Since that detector element is substantially transparent (at least in the preferred embodiment) to such visible radiation, and since there is no significantly reflective secondary surface between the frames, and since the frames are so close together, the visible radiation will pass through the pyroelectric material on one frame after one or more reflections and then through the material mounted on the adjacent detector frame to be reflected from the other secondary reflector 64 and to generally retrace its path back out of the Detector along the optical system. While this visible radiation may produce, in at least some pyroelectric materials, a measurable electrical signal, since substantially the same electrical signal will be simultaneously produced in both detector elements the two signals are easily cancelled electrically. If the light flash includes non-visible visible radiation components, since these components will strike both detector elements substantially simultaneously, and be substantially equal in intensity, they too are easily cancelled out by the associated electronic system. Trying to achieve this result with filters, such as of germanium, is virtually impossible.

Figure 4:
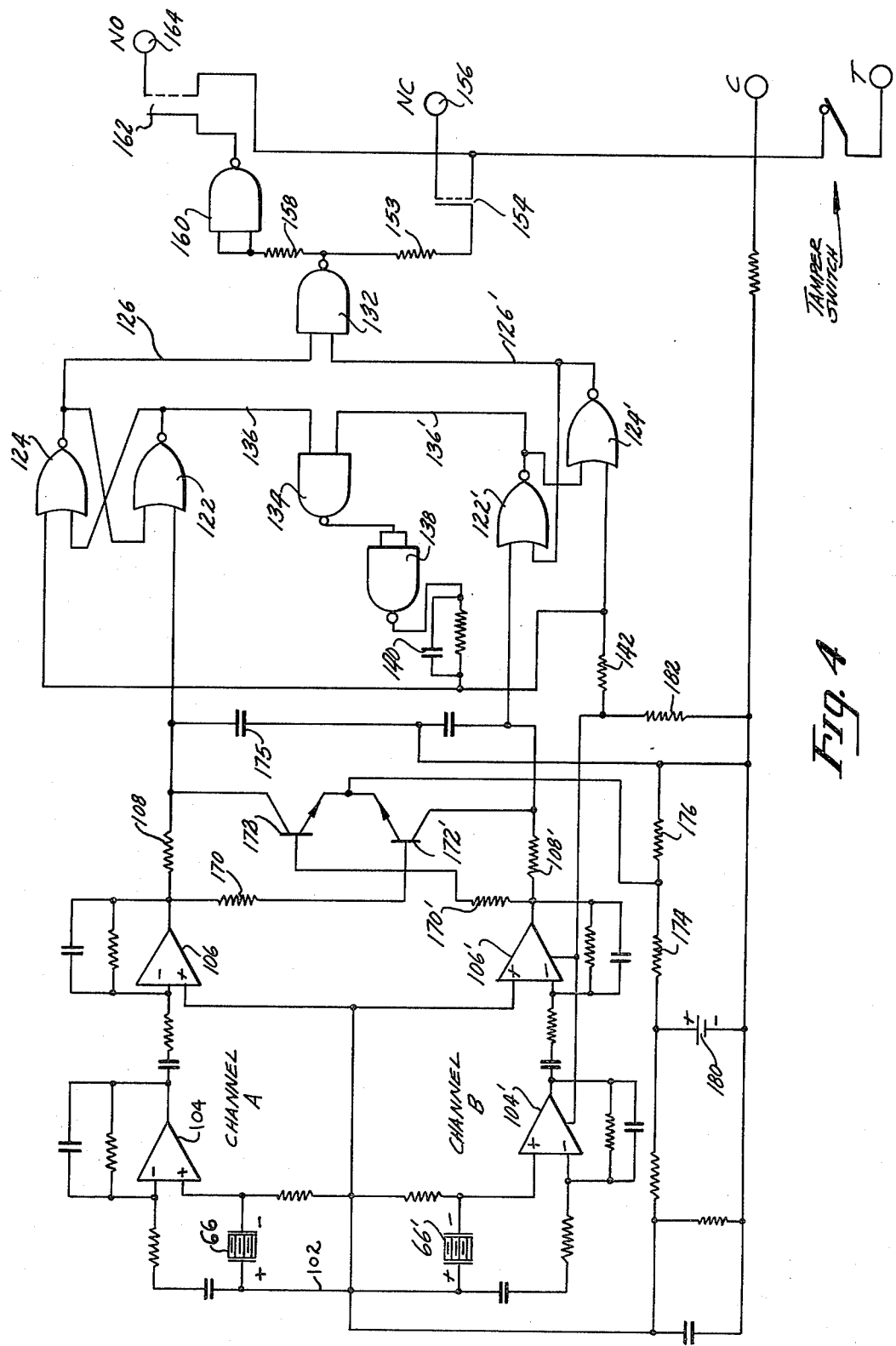
FIG. 4 is schematic diagram of a preferred electronic system incorporated in the Detector.

One preferred electrical system is schematically illustrated in FIG. 4. In general, the circuit illustrated in FIG. 4 employs two channels each connected to the output of one of the pyroelectric detector elements on frames 66. Each channel is used to trigger a latch circuit, combined outputs of the latch circuits being in turn employed to trigger an alarm condition. To prevent false alarms this circuit also senses a substantially simultaneous output of both pyroelectric elements, and when this condition occurs inhibits actuation of the alarm condition.

While the operation of the circuit shown in FIG. 4 will be apparent from the schematic to those skilled in the art, to briefly review it, the output of the pyroelectric elements 66 and 66' are applied to their associated chains of operational amplifiers 104 and 106 or 104' and 106'. Assuming that the input to operational amplifier 104 (or 104') is above some predetermined bias level, operational amplifier 106 (or 106') will produce an output. This output is applied through resistor 108 (or 108') to a latch circuit consisting of NOR gates 122 and 124 (or 122' and 124'). This causes the output of NOR gate 124, normally at a logic 0 voltage, to rise to a positive or logic 1 voltage. This output is applied over line 126 to NAND gate 132.

The output of NOR gate 122 is applied to NAND gate 134 over line 136. Since this output will be at a logic zero voltage when the latch circuit has latched, the output of NAND gate 134 will be a logic one voltage, and the output of connected NAND gate 138 will drop from a logic one to a logic zero voltage. Capacitor 140 is then charged through resistor 142, the charging rate of this timing circuit being adjusted to provide a period of a few seconds (e.g., 5 seconds) adequate for an intruder to pass from the first to the second field of view of the detector elements.

Assuming that an intruder passed into the field of view of detector element 66' before capacitor 140 was recharged which would reset the latch circuits, the circuitry of the second channel would respond in a similar fashion to that just described, actuating latch circuit 122'-124' and causing a positive output to appear on line 126'. These combined positive outputs result in a zero output of NAND gate 132, which is applied through resistor 153 to cause a MOS FET 154 to cease conduction, thereby opening the normally closed or conducting condition existing on terminal 156. In a similar fashion the logic zero output of NAND gate 132 is applied through resistor 158 to both inputs of NAND gate 160', causing its output to rise to a positive or logic 1 voltage. This voltage is applied to MOS FET 162 causing it to conduct, thereby electrically closing the normally open condition existing on terminal 164.

If simultaneous inputs were applied to pyroelectric elements 66 and 66', such as might occur as a result of a flash of sunlight or car headlights in the area being viewed by the elements, whichever channel first conducted would apply a voltage through resistor 170 (or 170') to the associated transistor 172 (or 172') causing it to conduct and shunt that signal to a lower voltage level determined by resistors 172 and 176. This lower level is sufficient to prevent an output from being applied by the other channel to its latch circuit, and prevents the occurence of an alarm condition. In this manner, elements 170 and 172 (and 170' and 172') cooperate with resistor 108 (and 108') and capacitor 175 (and 175')to provide timing means to delay generation of an alarm signal as a result of simultaneous, or virtually simultaneous, inputs to both channels.

As has been noted, and as will be obvious to those skilled in this art, an important feature of the Detector described in this application is its use of a pair of transparent detector elements, or sensors, configured to direct radiation through both sensors. Thus, visible radiation that passes through one sensor (with minimal light attenuation) will pass directly through the other sensor to result in substantially equal and simultaneous inputs being applied by the two pyroelectric elements and to their associated channels. This design inherently rejects such simultaneous inputs of radiation, and further assures that the system will not signal an alarm condition as a result of such simultaneous inputs.

Since the active components of the preferred system are semiconductors, their lifetimes can be expected to be exceedingly long. The preferred system, to permit its use virtually anywhere, is self-powered, incorporating a battery 180. While this battery may also have a long lifetime-it may for example be a Panasonic lithium battery, Model BR-2325—its voltage will gradually decay over the years. An important capability included in the preferred circuit is the ability to periodically test or check the battery voltage, to insure that it is adequate. Further, to avoid false alarms, this checking or testing is designed to only occur when the system has been tripped and is being reset, to prevent resetting unless adequate battery voltage exists.

The battery test circuit functions the following way. The voltage at the junction of resistor 142 and 182, (resistor 182 being a current set resistor for the operational amplifiers 104, 106, 104' and 106'), is slightly lower than the battery voltage. Thus, as the latching NOR gates 122, 124, 122' and 124' are tripped during normal daytime traffic, they will be reset after a short delay. However, when the battery voltage drops to a pre-determined lower level, resistor 142 will no longer be able to charge capacitor 140 to a high enough voltage level to reset the latching NOR gates, thereby signalling a weak battery condition when the alarm system is armed by the user of the system at the end of the day, rather than, for example at 3 a.m. in the morning. If the Detector is installed in a location with very little daytime traffic, such as long-term warehousing storage, once a year walk-by testing would be sufficient to determining the battery's condition, because if the battery became weak during that year prior to a test walk-by, the Detector would still function properly if an intruder passed through its fields of view, but the timer circuit would not reset, thereby indicating by an inability to re-arm the Detector, that it was time to change the battery.

While the basic operation of a preferred system and electronic circuit has been described, the action of certain components of the preferred system has not been set forth, and the operation of certain other components has only been briefly mentioned, all because the functioning of the system will be apparent to one skilled in this art basically from an examination of the schematic set forth in FIG. 4. For that reason, no description of the preferred system really is necessary to enable those skilled in this field to make full use of the preferred system and its novel features. For the same reason, various semiconductive components have not been identified further, and the values of the various elements have not been specified.

As has been noted, variations in the preferred Intruder Detector and the systems it includes may be made while still employing the teachings herein set forth to achieve the advantages described. Accordingly, the scope of the invention is not limited to the preferred embodiments which have been described, but rather is set forth in the following claims.

I claim:

1. An intruder detector having sensor means producing an electrical signal and responsive to an intruder, the sensor means including at least a pair of sensor elements viewing adjacent fields and responsive to the passage of an intruder between those fields to cause first one sensor then the other sensor of the pair to produce an electrical signal;

electronic means connected to the sensor means and responsive to the electrical signals produced by the pair of sensor elements to generate an alarm signal, the electronic means having two channel means, each channel means being connected to a corresponding one of the sensor elements and responsive to the electrical signals of that element to produce a first output signal;

alarm actuation means electrically responsive to a given intensity of a first output signal from one then the other of the two channel means, the first output signals being of an intensity at least equal to a given intensity, to generate an alarm signal; and inhibition means responsive to the first output signal of either channel to prevent response by the alarm actuation means to the substantially simultaneous generation of the first output signal of the other channel of an intensity less than said given intensity thereby to inhibit the generation of an alarm signal in response to substantially simultaneous generation of first output signals by the two channel means.

2. An intruder detector as set forth in claim 1 including resetting means to terminate the generation of an alarm signal, and power test means responsive to a reduced power condition to prevent operation of the resetting means thereby causing the alarm actuation means to continue to generate an alarm signal once actuated.

3. An intruder detector as set forth in claim 2, the detector including battery means to supply electrical power to operate the detector, the power test means being responsive to reduced battery voltage.

4. An intruder detector as set forth in claim 1 in which the inhibition means is responsive to the first output signal of either channel to electrically hold the output of the other channel at a level less than the first output signal for a predetermined interval.

5. An intruder detector as set forth in claim 4 in which the predetermined interval of the inhibition means is equal to the duration of the first output signal to which the inhibition means responds.

6. An intruder detector as set forth in claim 4 in which the inhibition means electronically grounds one output channel in response to the first output signal of the other channel.

7. A test circuit for an intruder detector responsive to the presence of an intruder to generate an alarm signal when operating normally, the detector there after being re-armed to terminate the alarm signal, the test circuit including:

monitoring means responsive to an abnormal condition of the detector to produce an output signal, and circuit means responsive to the output signal to prevent re-arming of the detector.

8. A test circuit as set forth in claim 7 in which the detector is battery powered and in which the monitoring means is responsive to a low battery voltage condition.

* * * * *